United States Patent [19]
Carn

[11] 3,917,083
[45] Nov. 4, 1975

[54] LOAD LIFTING AND TRANSPORTING ARRANGEMENT

[76] Inventor: Patrick Carn, Route De Benodet, Quimper 29000 Finister, France

[22] Filed: Jan. 8, 1974

[21] Appl. No.: 431,763

[30] Foreign Application Priority Data
Jan. 8, 1973    France .............................. 73.01205

[52] U.S. Cl.... 214/38 CA; 280/47.13 B; 280/414 R
[51] Int. Cl.² ................... B65G 67/02; B62D 63/08
[58] Field of Search ........... 214/38 CA, 86 R, 86 A; 280/47.13 B, 414 R, 414 A

[56] References Cited
UNITED STATES PATENTS
2,608,314    8/1952    Krider ......................... 280/414 R X
2,776,761    1/1957    Lovelace ..................... 280/414 R X Primary Examiner—Robert G. Sheridan
Attorney, Agent, or Firm—Weiser, Stapler & Spivak

[57] ABSTRACT

A load lifting and transporting arrangement is formed of an inverted-V gantry, with tackle attached to the apex. The tackle lifts the load when the gantry is erect. The load is then lowered onto a trailer and the gantry lowered, and its legs attached to the trailer undercarriage to form its drawbar, while the tackle secures the load to the trailer.

5 Claims, 3 Drawing Figures

LOAD LIFTING AND TRANSPORTING ARRANGEMENT

This invention relates to a load lifting and transporting arrangement, and particularly to such an arrangement which is suitable for boats.

A principal object of the invention is to provide an arrangement which permits the lifting of a load, such as a boat, in order to place it on a wheeled trailer and which, after the load is in place, constitutes an element of the trailer serving to hold the load in place and to operate the trailer.

Another object of the invention is to provide a lifting device for such an arrangement which is of simple construction and which can rest on the ground without sinking into it when it supports the load.

The arrangement according to the invention is characterized in that it comprises a gantry from which the load to be lifted is suspended, a trailer provided with wheels which is placed beneath the lifted load, and coupling means permitting the feet of the gantry to be tied to the trailer undercarriage to form a drawbar which provides a point of attachment for the load being carried and also serves to operate the trailer.

In a preferred embodiment the gantry consists of two tubes forming a V, the junction of the V constituting the apex of the gantry. The tubes are joined at that apex by a shaft which passes through their ends and provides the anchor point for tackle intended to lift the load.

According to a feature of the invention, the gantry tubes carry, at the free ends of the branches of the V, a skid-like member perpendicular to the tubes. This skid is bent at each end in a direction generally parallel to the tubes, so as to form a ground rest when the gantry is used to lift the load, and to form a link to the trailer when the gantry serves as drawbar for operating the trailer.

For further details and advantages, reference is made to the following detailed description of an illustrative embodiment of the invention, in the light of the accompanying drawings, wherein.

Figure 1:
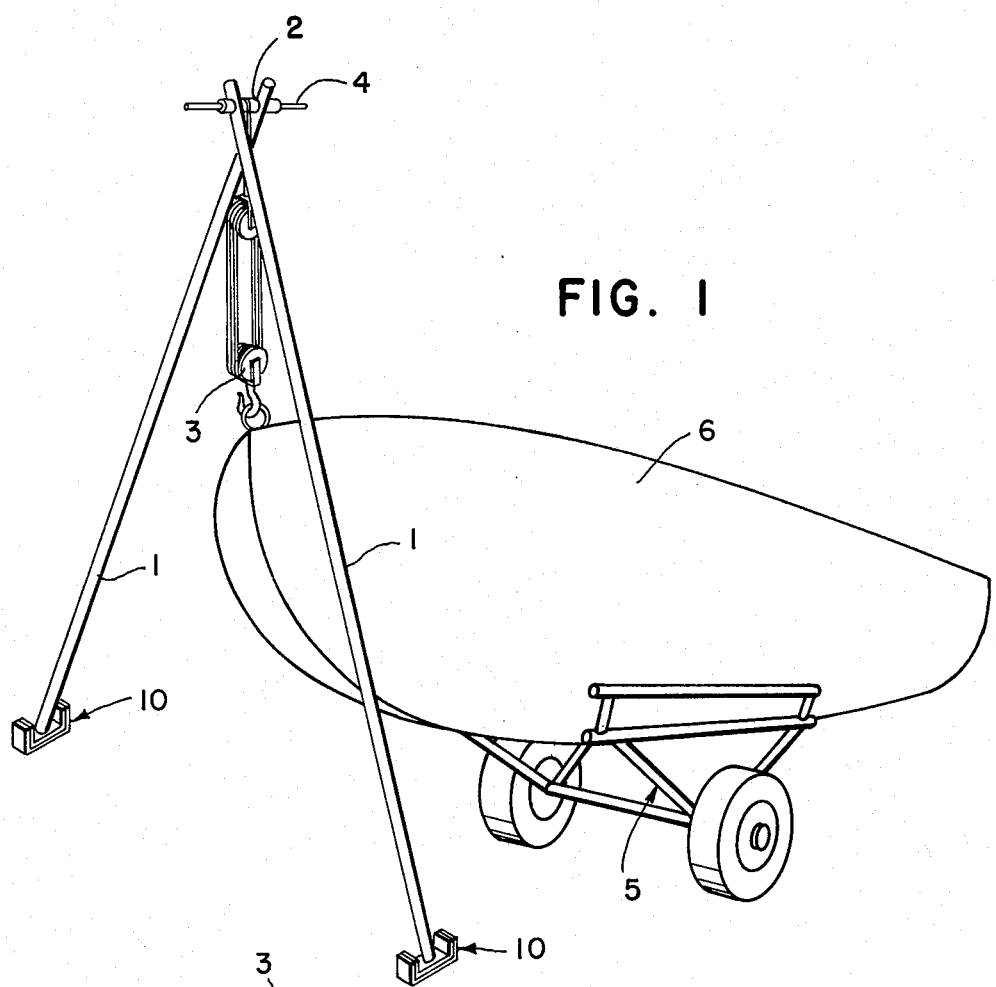
FIG. 1 is a perspective view of the arrangement showing the gantry erected vertically to lift the load.

In accordance with the invention as shown in FIG. 1, the lifter and transporter arrangement comprises a gantry formed of two metal tubes 1 traversed by a shaft 2. Tackle 3 is attached to shaft 2 and load 6. A transverse tube 4 which serves as a grip is also traversed by shaft 2. Skid-like members 10 are attached to the free ends of tubes 1.

Figure 2:
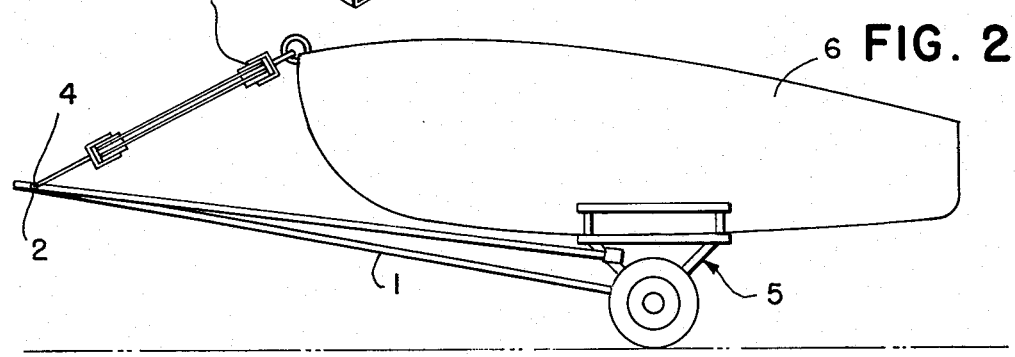
FIG. 2 is an elevation of the arrangement, showing the gantry used as a drawbar fixed to the trailer upon which the load rests.
Figure 3:
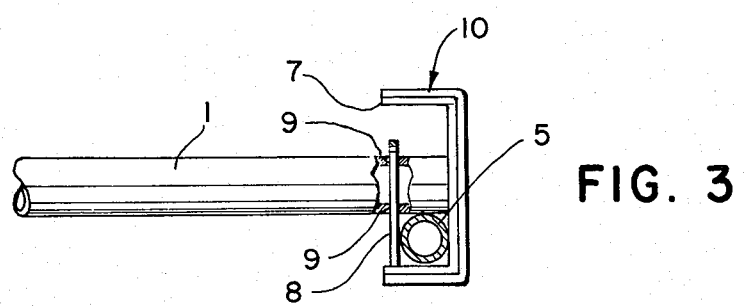
FIG. 3 is a diagrammatic view of the skid showing in detail the connection of one of the gantry tubes to the trailer undercarriage.

In the form shown in FIG. 2, tubes 1 are attached to the undercarriage 5 of the trailer, tackle 3 being attached to shaft 2 and load 6. Details of the skid are shown in FIG. 3 in which the skids 10 are generally U-shaped metal strips provided with rubber 7 on the side opposite to that which rests on the ground. A locking pin 8 slides through two holes 9 provided in tube 1. Tubular element 5 of the trailer undercarriage is clamped between the hook-shaped skid 10, tube 1 and pin 8.

The lifting and transporting arrangement is used as follows.

When the trailer is to be loaded, tubes 1 of the gantry are raised to a vertical position above load 6, to which tackle 3 is attached. This tackle is operated to lift the load. The tackle is then secured in its raised position and the trailer is placed below load 6. Tackle 3 is then released and load 6 rests on the trailer. Tubes 1 are lowered and elements 10 are brought into position for coupling to tubular elements 5 of the trailer undercarriage by sliding each locking pin 8 upward. The pin is then permitted to fall back into place, thereby completing the coupling between elements 10 and the trailer undercarriage. Tackle 3 is again placed under tension to firmly secure the load to gantry tubes 1. Tube 4 then serves as a pull for the entire arrangement.

Obviously, to unload, these operations are performed inversely.

I claim:

1. Load lifting and transporting arrangement comprising
   A. gantry means for suspending the load to be lifted above a surface,
      1. said gantry means being movable from a first position for lifting a load to a second position for transporting the load,
      2. said gantry means having extremities for resting on the surface above which said load is lifted when in the first position;
   B. a wheeled trailer including an undercarriage for placement beneath said load; and
   C. coupling means for attaching said extremities to the undercarriage of said trailer to form a drawbar for anchoring said load and pulling said trailer when the gantry means is moved to the said second position.

2. The arrangement of claim 1, wherein said gantry means comprises two tubular means joined in a V whose junction forms the apex of the gantry, said tubes being joined by a shaft which traverses their extremities and forms the supports for tackle means, said tackle means supporting said suspended load and holding it in place during transport.

3. The arrangement of claim 2, wherein said gantry tubes have skids attached to their free ends, each skid being formed of a member generally perpendicular to its respective tube and having upturned ends generally parallel to said tubes.

4. The arrangement of claim 3, wherein said skids provide supports for said tubes when said gantry is vertically erect to suspend said load, and provide coupling means to the trailer when said gantry serves as drawbar for said trailer.

5. The arrangement of claim 4 further comprising locking pins insertable through holes in said tubes, and so positioned that the undercarriage of said trailer is clamped between pin and skid when said gantry serves as said drawbar.

* * * * *